US010133142B2

(12) United States Patent
Doerr et al.

(10) Patent No.: US 10,133,142 B2
(45) Date of Patent: Nov. 20, 2018

(54) SILICON MODULATORS AND RELATED APPARATUS AND METHODS

(71) Applicant: Acacia Communications, Inc., Maynard, MA (US)

(72) Inventors: Christopher Doerr, Middletown, NJ (US); Long Chen, Marlboro, NJ (US); Ricardo Aroca, New York, NY (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 15/472,946

(22) Filed: Mar. 29, 2017

(65) Prior Publication Data

US 2017/0285437 A1 Oct. 5, 2017

Related U.S. Application Data

(60) Provisional application No. 62/314,674, filed on Mar. 29, 2016.

(51) Int. Cl.
*G02F 1/035* (2006.01)
*G02F 1/225* (2006.01)
(Continued)

(52) U.S. Cl.
CPC ............ *G02F 1/2257* (2013.01); *G02F 1/025* (2013.01); *G02F 1/2255* (2013.01); *G02F 2001/212* (2013.01)

(58) Field of Classification Search
CPC ...... G02F 1/2257; G02F 1/025; G02F 1/2255; G02F 2001/212
See application file for complete search history.

(56) References Cited

U.S. PATENT DOCUMENTS 5,208,697 A    5/1993   Schaffner et al.
5,359,449 A   10/1994   Nishimoto
(Continued)

FOREIGN PATENT DOCUMENTS

JP         5994230 B2 * 9/2016

OTHER PUBLICATIONS

Aroca et al., A 2.4-V 60-Gb/s CMOS Driver With Digitally Variable Amplitude and Pre-Emphasis Control at Multiple Peaking Frequencies. IEEE J Solid-State Circ. Oct. 2011;46(10):2226-39.
(Continued)

*Primary Examiner* — Ellen Kim
(74) *Attorney, Agent, or Firm* — Wolf, Greenfield & Sacks, P.C.

(57) ABSTRACT

An optical Mach Zehnder modulator is described. The optical Mach Zehnder modulator may comprise a plurality of segments separated by curved waveguides. For example, an optical Mach Zehnder modulator may comprise a first waveguide arm having a first pn-junction formed therein, a second waveguide arm having a second pn-junction formed therein, a third waveguide arm coupled to the first waveguide arm via a first curved waveguide and a fourth waveguide arm coupled to the second waveguide arm via a second curved waveguide. The segments may have the same polarities. Alternatively, the segments may have opposite polarities. The different segments may be driven using different RF signals. The RF signals may be delayed from one another.

15 Claims, 7 Drawing Sheets

(51) Int. Cl.
*G02F 1/025* (2006.01)
*G02F 1/21* (2006.01)

(56) References Cited

U.S. PATENT DOCUMENTS

| | | | |
|---|---|---|---|
| 7,394,948 B1 | 7/2008 | Zheng et al. | |
| 8,346,025 B2* | 1/2013 | Gill | B29D 11/00663 |
| | | | 385/131 |
| 9,036,954 B2* | 5/2015 | Kobrinsky | G02F 1/035 |
| | | | 385/3 |
| 9,195,079 B2 | 11/2015 | Doerr et al. | |
| 9,531,478 B2* | 12/2016 | Zheng | H04B 10/2575 |
| 2002/0159738 A1 | 10/2002 | Aoki et al. | |
| 2003/0025962 A1 | 2/2003 | Nishimura | |
| 2003/0227666 A1 | 12/2003 | Bridges | |
| 2011/0318016 A1 | 12/2011 | Wyss et al. | |
| 2012/0163811 A1 | 6/2012 | Doany et al. | |
| 2013/0176609 A1 | 7/2013 | Noguchi | |
| 2013/0343693 A1 | 12/2013 | Doerr | |
| 2014/0036937 A1 | 2/2014 | Doerr | |
| 2014/0064659 A1 | 3/2014 | Doerr et al. | |
| 2014/0112611 A1* | 4/2014 | Vermeulen | G02F 1/2257 |
| | | | 385/3 |
| 2014/0133866 A1 | 5/2014 | Liu et al. | |
| 2014/0153931 A1 | 6/2014 | Doerr | |
| 2015/0030339 A1 | 1/2015 | Margalit et al. | |
| 2015/0036965 A1 | 2/2015 | Prosyk et al. | |
| 2015/0049978 A1* | 2/2015 | Fujikata | G02F 1/025 |
| | | | 385/3 |
| 2015/0062689 A1 | 3/2015 | Doerr | |
| 2015/0198859 A1 | 7/2015 | Chen | |
| 2015/0212345 A1 | 7/2015 | Chen et al. | |
| 2015/0229408 A1 | 8/2015 | Ding et al. | |
| 2016/0013866 A1 | 1/2016 | Doerr | |
| 2016/0041336 A1 | 2/2016 | Doerr et al. | |
| 2016/0103382 A1* | 4/2016 | Liboiron-Ladouceur | |
| | | | H04B 10/516 |
| | | | 385/3 |
| 2016/0218811 A1* | 7/2016 | Chen | H04B 10/5561 |
| 2016/0308618 A9 | 10/2016 | Chen et al. | |
| 2018/0039151 A1 | 2/2018 | Doerr et al. | |

OTHER PUBLICATIONS

Papuchon et al., 4-Bits Digitally Driven Integrated Amplitude Modulator for Data Processing. Electron Lett. Feb. 14, 1980;16(4):142-4.

Shastri et al., Experimental Demonstration of Ultra-Low-Power Single Polarization 56 Gb/s QAM-16 Generation without DAC using CMOS Photonics. 2014 European Conference on Optical Communication (ECOC). Cannes, France. PD.2.5. Sep. 21-25, 2014. 3 pages.

Milivojevic et al., 112Gb/s DP-QPSK Transmission Over 2427km SSMF Using Small-Size Silicon Photonic IQ Modulator and Low-Power. 2013 Optical Fiber Communication Conference and Exposition and the National Fiber Optic Engineers Conference (OFC/NFOEC), Anaheim, CA. Mar. 17-21, 2013; 5-7.

International Search Report and Written Opinion dated Sep. 13, 2017 in connection to International Application No. PCT/US2017/038489.

\* cited by examiner

SILICON MODULATORS AND RELATED APPARATUS AND METHODS

RELATED APPLICATIONS

This Application claims the benefit under 35 U.S.C. § 119(e) of U.S. Provisional Patent Application Ser. No. 62/314,674, entitled "SILICON MODULATORS AND RELATED APPARATUS AND METHODS" filed on Mar. 29, 2016, which is hereby incorporated herein by reference in its entirety.

BACKGROUND

Field

The present application relates to optical Mach Zehnder modulators.

Related Art

Mach Zehnder interferometers are often used in optical communications to modulate the amplitude of optical signals. Typical optical Mach Zehnder interferometers include two waveguide arms running in parallel to one another. At least one of the waveguide arm includes a phase modulator configured to shift the phase of an optical signal. Amplitude and/or phase modulation is achieved by combining the optical signals traveling along the two waveguide arms.

BRIEF SUMMARY

According to one aspect of the present application, a Mach Zehnder modulator is provided. The Mach Zehnder modulator may comprise a first waveguide arm having a first pn-junction formed therein, a second waveguide arm having a second pn-junction formed therein, a third waveguide arm having a third pn-junction formed therein, the third waveguide being coupled to the first waveguide arm via a first curved waveguide, a fourth waveguide arm having a fourth pn-junction formed therein, the fourth waveguide arm being coupled to the second waveguide arm via a second curved waveguide, an input waveguide coupled to both the first waveguide arm and second waveguide arm, and an output waveguide coupled to both the third waveguide arm and fourth waveguide arm.

According to another aspect of the present application, a method of operating a Mach Zehnder modulator is provided. The method may comprise coupling an optical signal to first and second waveguide arms of the Mach Zehnder modulator, coupling the optical signal from the first waveguide arm to a third waveguide arm of the Mach Zehnder modulator and from the second waveguide arm to a fourth waveguide arm of the Mach Zehnder modulator, the third waveguide arm being coupled to the first waveguide arm via a first curved waveguide and the fourth waveguide arm being coupled to the second waveguide arm via a second curved waveguide, and modulating the optical signal by driving, with an RF signal, a first pn-junction formed in the first waveguide arm and a second pn-junction formed in the second waveguide arm.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Applicant has appreciated that the modulation efficiency of an optical Mach Zehnder modulator can be affected by misalignments of the phase modulators, which are often implemented using pn-junctions or pin-junctions, with respect to the waveguides arms. Accordingly, such misalignments may cause imbalances in the absorption loss in the waveguide arms of an optical Mach Zehnder modulator. Such imbalances may lead to reductions in the extinction ratio of an optical Mach Zehnder modulator, degradation in the modulation chirp, and/or increases in the insertion loss.

Figure 1A:
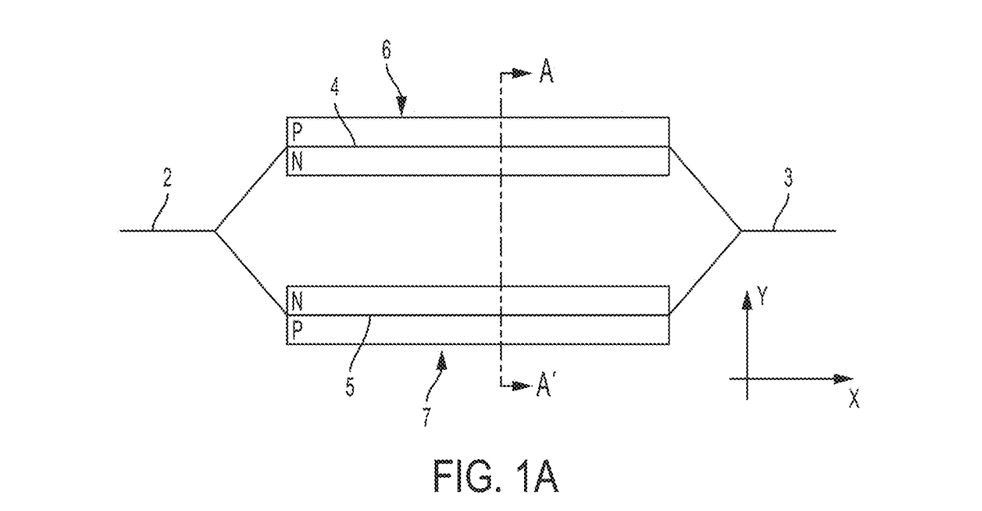
FIG. 1A illustrates schematically an optical Mach Zehnder modulator.

FIG. 1A illustrates schematically an optical Mach Zehnder modulator. Optical Mach Zehnder modulator 1 includes an input waveguide 2, an output waveguide 3, and waveguide arms 4 and 5, disposed between input waveguide 2 and output waveguide 3. Waveguide arm 4 includes pn-junction 6, and waveguide arm 5 includes pn-junction 7. The pn-junctions act as phase modulators. Amplitude and/or phase modulation is achieved by allowing the optical signals obtained from waveguide arms 4 and 5 to interfere with each other. The combined signal is output from output waveguide 3.

Figure 1B:
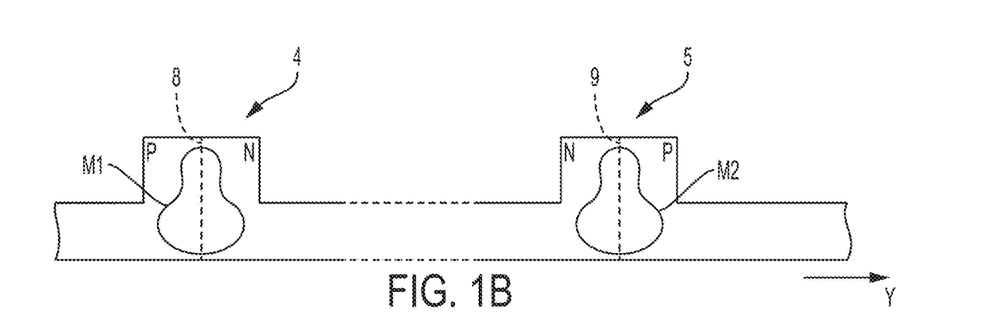
FIG. 1B is a cross sectional view of the optical Mach Zehnder modulator of FIG. 1A.

FIG. 1B is a cross sectional view of optical Mach Zehnder modulator 1 taken along the AA' line in FIG. 1A. Numerals 8 and 9 indicate the junction interfaces for pn-junction 6 and 7, respectively. In this configuration, pn-junctions 6 and 7 are arranged with mirror-image symmetry (e.g., such that the size and location of the p-region in waveguide arm 4 equals the size and location of the p-region in waveguide arm 5, and the size and location of the n-region in waveguide arm 4 equals the size and location of the n-region in waveguide arm 5). As illustrated, optical modes M1 and M2, which travel along waveguide arms 4 and 5, respectively, experience the same overlap with the respective p-regions and the same overlap with the respective n-regions, and as a result undergo the same optical absorption loss and exhibit the same modulation efficiency, in spite of the fact that p-regions and n-regions have different free-carrier absorption and modulation coefficients.

Figure 1C:
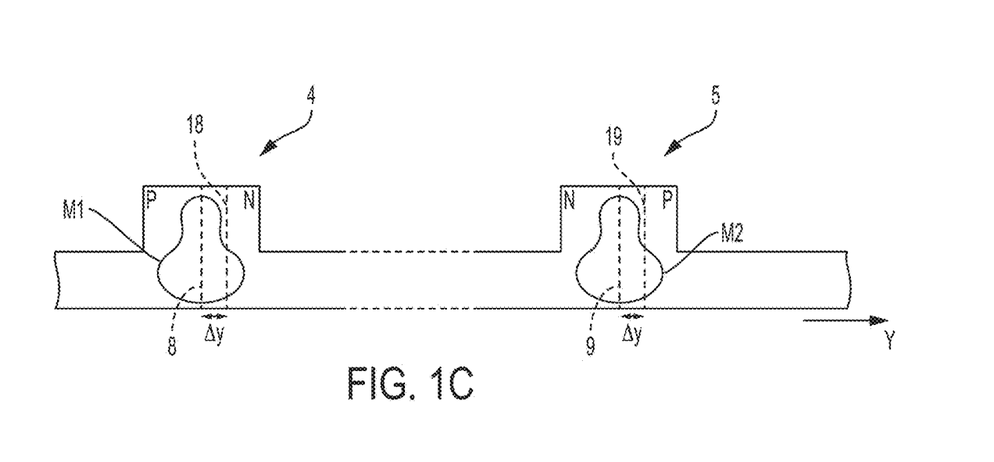
FIG. 1C is a cross sectional view of an optical Mach Zehnder modulator exhibiting junction misalignment.

However, in some circumstances, such a balance in the absorption loss may be impaired due to unwanted lateral misalignments of the pn-junctions with respect to the waveguide arms of the optical Mach Zehnder modulator. One such circumstance is illustrated in FIG. 1C. In this case, the junction interfaces (indicated by numerals 18 and 19) are laterally offset with respect to the desired locations, which are indicated by numerals 8 and 9, by an amount equal to Δy. Such offsets may be caused by unwanted misalignments occurring during the fabrication process. For example, the offsets may be due to misalignments between the photomasks used to form the doping implants and the photomask used to form the waveguide arms. Such misalignments may result from the fact that fabrication processes have finite tolerances, or may be the result of human errors. In the case illustrated in FIG. 1C, optical mode M1 overlaps with the p-region to a greater extent than optical mode M2 overlaps with the p-region, and optical mode M2 overlaps with the n-region to a greater extent than optical mode M1 overlaps with the n-region. As a result, optical modes M1 and M2 experience unbalanced optical absorption losses and modulation efficiencies, which may cause a reduction in the extinction ratio and degradation of the modulation chirp of the modulated optical signal coming out of output waveguide 3.

Applicant has appreciated that reductions in the performance of optical Mach Zehnder modulators caused by misalignments in the phase modulators (e.g., pn-junctions) with respect to the waveguide arms may be limited by partitioning the modulator's optical path in segments. In some embodiments, the segments may be separated by curved waveguides. The segments may be configured such that, when one segment exhibits a pn-junction misalignment, another segment may exhibit a pn-junction misalignment in the opposite direction. In this way, imbalances in the absorption loss resulting from misalignments in the pn-junctions may be compensated.

Another aspect of the present application provides segmented optical Mach Zehnder modulators that are configured to limit the attenuation losses incurred by the RF modulating signals. In some embodiments, instead of relying on a single RF signal to travel along the entire length of the optical Mach Zehnder modulator, different RF signals may be used for the different segments. In this way, each RF signal may travel a shorter distance, thereby limiting attenuation losses.

The aspects and embodiments described above, as well as additional aspects and embodiments, are described further below. These aspects and/or embodiments may be used individually, all together, or in any combination of two or more, as the application is not limited in this respect.

Figure 2A:
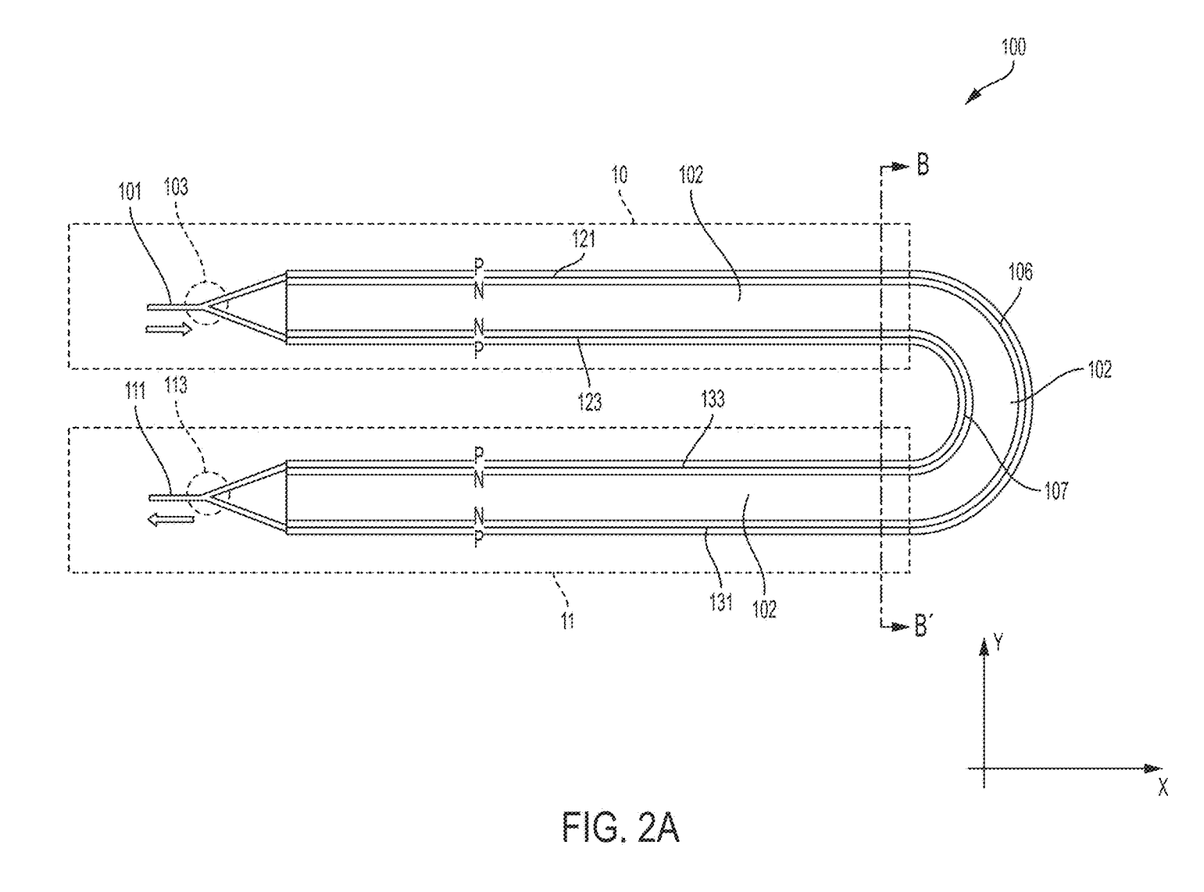
FIG. 2A illustrates schematically an optical Mach Zehnder modulator having a plurality of curved waveguides, according to some non-limiting embodiments.

A non-limiting example of an optical Mach Zehnder modulator having curved waveguides is illustrated in FIG. 2A. As illustrated, optical Mach Zehnder modulator 100 comprises two segments and curved waveguides optically coupling the two segments with one another. It should be appreciated that the aspects of the present application are not limited to optical Mach Zehnder modulators having two segments, as any other suitable number of segments may be used. Optical Mach Zehnder modulator 100 may comprise input waveguide 101, output waveguide 111, waveguide arms 121, 123, 131, and 133, couplers 103 and 113, and curved waveguides 106 and 107. Input waveguide 101 may be coupled to waveguide arms 121 and 123 via coupler 103, which may be a 3 dB coupler in some embodiments. Waveguide arm 121 may be coupled to waveguide arm 131 via curved waveguide 106. Waveguide arm 123 may be coupled to waveguide arm 133 via curved waveguide 107. Output waveguide 111 may be coupled to waveguide arms 131 and 133 via coupler 113, which may be a 3 dB coupler in some embodiments. As illustrated, waveguide arms 121 and 123 may form segment 10 and waveguide arms 131 and 133 may form segment 11. Optical Mach Zehnder modulator 100 may be disposed on a silicon substrate in some embodiments. Region 102, disposed between waveguide arms 121 and 123, between curved waveguides 106 and 107, and between waveguide arms 131 and 133, may comprise a partially etched layer of material (e.g., silicon). In some embodiments, one or more electrodes for biasing the pn-junctions may be disposed in region 102.

Optical Mach Zehnder modulator 100 may comprise phase modulators configured to modulate the phase of an optical signal. Phase modulators may be implemented using pn-junctions in some embodiments. However, other types of phase modulators, such as pin-junctions, may alternatively or additionally be used. In some embodiments, waveguide arms 121, 123, 131 and 133 may comprise lateral pn-junctions. For example, a pn-junction may be configured such that its p-region is separated from its n-region along a direction in the modulator's plane (the xy-plane). In some embodiments, waveguide arms 121, 1232, 131 and 133 may comprise single, continuous pn-junctions. In other embodiments, waveguide arms 121, 123, 131 and 133 may comprise alternating pn-junctions and undoped regions. In this configuration, a waveguide arm may comprise more than one pn-junction. In some embodiments, curved waveguides 106 and 107 are undoped. In other embodiments, curved waveguides 106 and 107 comprise pn-junctions. The pn-junctions may be arranged to provide a continuous modulation path between segment 10 and segment 11. Alternatively, curved waveguides 106 and 107 may comprise alternating pn-junctions and undoped regions.

FIG. 2A shows a configuration in which pn-junctions are continuously defined along the modulator's optical path. In other embodiments, the pn-junctions may be segmented. For example, portions of curved waveguides 106 and 107 may be undoped. Electrodes (not shown in FIG. 2A) may be disposed along the waveguides and may be configured to provide RF signals to the pn-junctions. In some embodiments, these electrodes are arranged in a traveling wave configuration (e.g., the electrodes are continuous between segment 10 and segment 11). In other embodiments, these electrodes are arranged in a lumped configuration.

Segments 10 and 11 may be configured such that, if segment 10 exhibits a misalignment of the pn-junction, segment 11 exhibits a misalignment of the pn-junction in the opposite direction. In this way, imbalances in the absorption loss experienced by optical modes traveling along segments 10 and 11 may be mutually canceled (or at least limited). In some embodiments, segment 10 may be substantially parallel to segment 11. For example, waveguide arm 121 may be substantially parallel (e.g., with an angular offset that is less than 10°) to waveguide arm 131, and waveguide arm 123 may be substantially parallel to waveguide arm 133. Alternatively, or additionally, waveguide arm 121 may be substantially parallel to waveguide arm 133, and waveguide arm 123 may be substantially parallel to waveguide arm 131. In some embodiments, curved waveguides 106 and 107 may be U-shaped (e.g., may form a turn that is between 85° and 95°, between 80° and 100°, or between 70° and 110°). In some embodiments, a U-shape may be obtained using more than one curved waveguide. In some embodiments, segments 10 and 11 may be separated by an odd number of U-shaped curved portions, such that they exhibit opposite directions of propagation along the y-axis. However, curved waveguides 106 and 107 are limited to U-shapes.

Figure 2B:
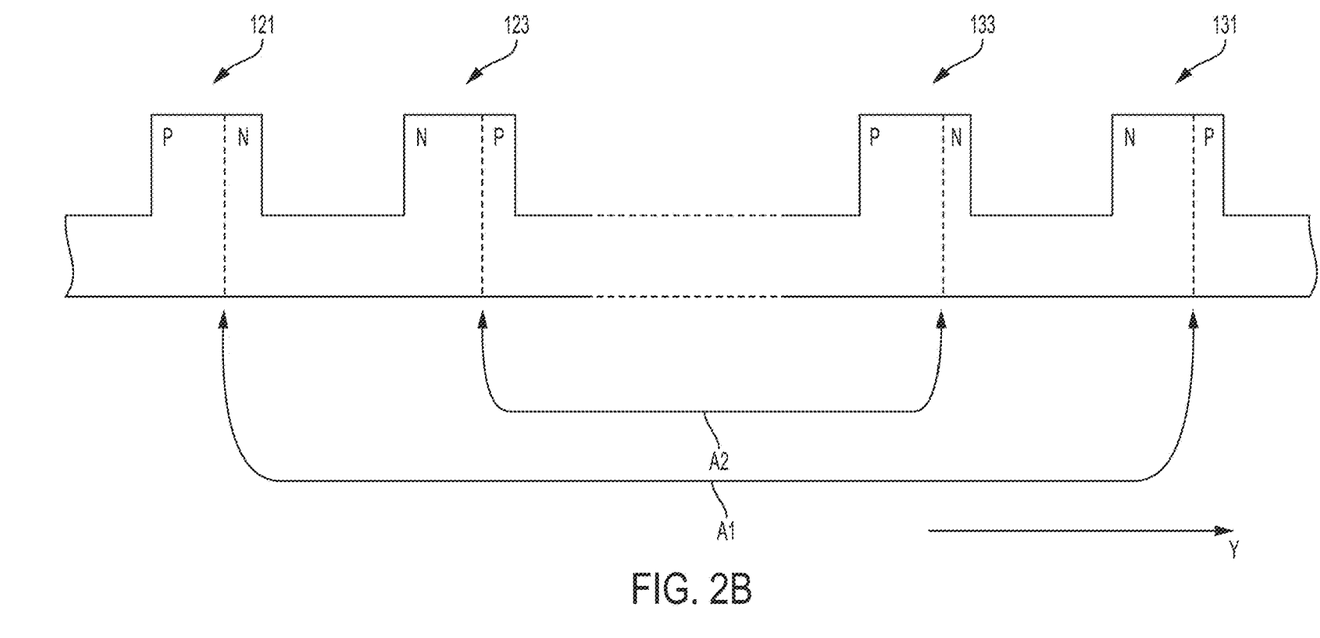
FIG. 2B is a cross sectional view of the optical Mach Zehnder modulator of FIG. 2A, according to some non-limiting embodiments.

FIG. 2B, which is a cross sectional view of optical Mach Zehnder modulator 100 taken along the BB' line, illustrates how imbalances in absorption loss caused by pn-junction misalignments may be compensated for. Here, it is assumed that all pn-junctions are laterally offset in a direction parallel to the y-axis. As a result, waveguide arms 121 and 133 have a majority of p-doping, while waveguide arms 123 and 131 have a majority of n-doping. However, since one optical mode first travels along waveguide arm 121 and then travels along waveguide arm 131 (as indicated by arrow A1) and another optical mode first travels along waveguide arm 123 and then travels along waveguide arm 133 (as indicated by arrow A2), the absorption loss experiences by the two optical modes may be balanced, at least in part.

Figure 3A:
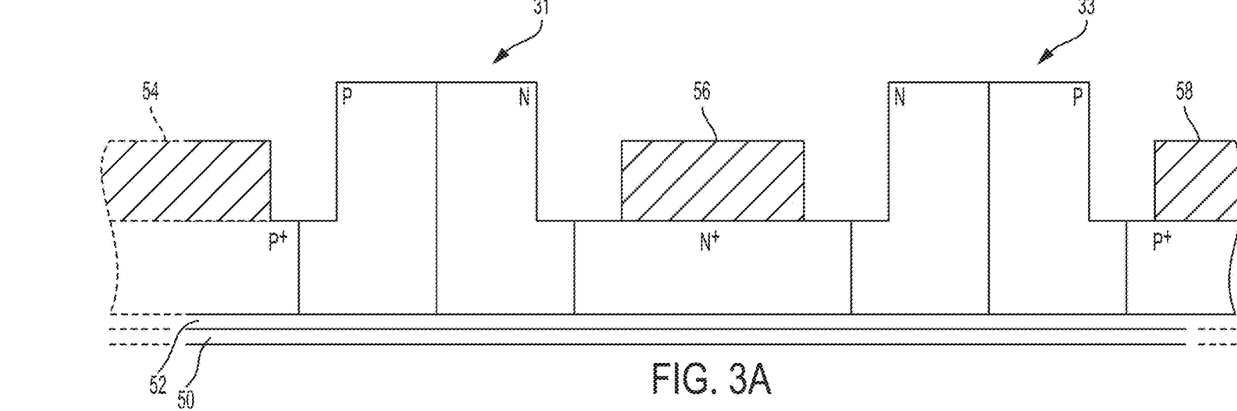
FIG. 3A is a cross sectional view illustrating a segment of an optical Mach Zehnder modulator having a first polarity, according to some non-limiting embodiments.
Figure 3B:
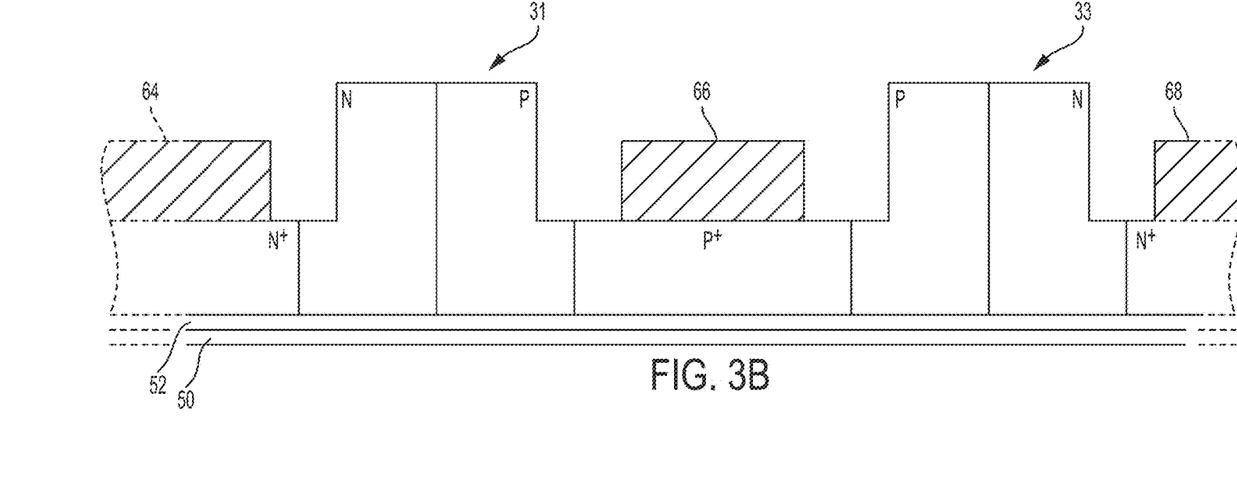
FIG. 3B is a cross sectional view illustrating a segment of an optical Mach Zehnder modulator having a second polarity different than that of the optical Mach Zehnder modulator of FIG. 3A, according to some non-limiting embodiments.

In the example of FIG. 2A, segments 10 and 11 exhibit the same polarity. However, opposite polarities may alternatively be used in other embodiments. Examples of polarities are illustrated in FIGS. 3A-3B. The polarity illustrated in FIG. 3A is such that waveguide arms 31 and 33 have respective n-regions that face one another. In this configuration, the n-region of waveguide arm 31 is closer to the n-region of waveguide arm 33 than it is to the p-region of waveguide arm 33. Similarly, the n-region of waveguide arm 33 is closer to the n-region of waveguide arm 31 than it is to the p-region of waveguide arm 31.

By contrast, the polarity illustrated in FIG. 3B is such that waveguide arms 31 and 33 have respective p-regions that face one another. In this configuration, the p-region of waveguide arm 31 is closer to the p-region of waveguide arm 33 than it is to the n-region of waveguide arm 33. Similarly, the p-region of waveguide arm 33 is closer to the p-region of waveguide arm 31 than it is to the n-region of waveguide arm 31. Two segments are said to have the same polarity when they both have the polarity of FIG. 3A, or the they both have the polarity of FIG. 3B. Vice versa, two segments are said to have the opposite polarities, when one segment has the polarity of FIG. 3A and the other segment has the polarity of FIG. 3B.

In some embodiments, optical Mach Zehnder modulators of the type described herein are formed on a silicon substrate 50, as illustrated in FIGS. 3A-3B. In some embodiments, a layer of dielectric 52 (e.g., a silicon oxide layer) is disposed between substrate 50 and the material layer used to form the optical Mach Zehnder modulator. Such a material layer may be silicon in some embodiments. In some embodiments, electrodes may be used to control the pn-junctions. For example, the configuration illustrated in FIG. 3A may comprise electrodes 54 and 58 for contacting the p-regions, via highly-doped $p^+$-regions, and electrode 56 for contacting the n-regions, via highly-doped $n^+$-regions. Similarly, the configuration illustrated in FIG. 3B may comprise electrodes 64 and 68 for contacting the n-regions, via highly-doped $n^+$-regions, and electrode 66 for contacting the p-regions, via highly-doped $p^+$-regions.

Figure 4A:
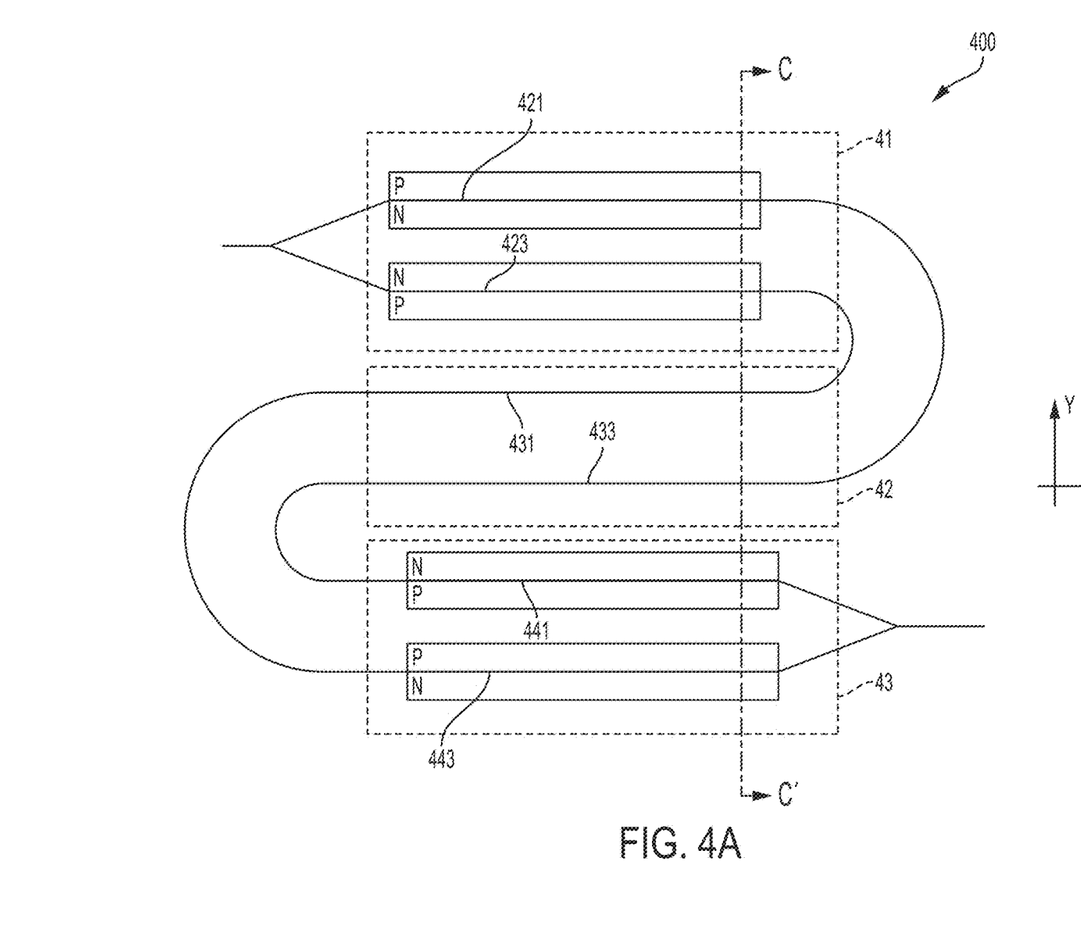
FIG. 4A illustrates schematically another optical Mach Zehnder modulator having a plurality of curved waveguides, according to some non-limiting embodiments.

Optical Mach Zehnder modulators of the type described herein may be obtained using opposing polarities in some embodiments. One such example is illustrated in FIG. 4A. Optical Mach Zehnder modulator 400 may comprise a plurality of segments 41, 42, and 43. It should be appreciated than any suitable number of segments may be used. Segment 41 may comprise waveguide arms 421 and 423, segment 42 may comprise waveguide arms 431 and 433, and segment 43 may comprise waveguide arms 431 and 433. Adjacent segments may be separated from each other by curved waveguides. In the example illustrated, segments 41 and 43 comprise pn-junctions defined according to opposite polarities, while segment 42 does not comprise pn-junctions. Unlike the embodiment of FIG. 2A, in which segments 10 and 11 may be arranged such that the optical modes travel in opposite directions, segments 41 and 43 may be arranged such that optical modes travel in the same direction. This may accomplished, for example, by separating the two segments by an even number of U-shaped curved waveguides.

Figure 4B:
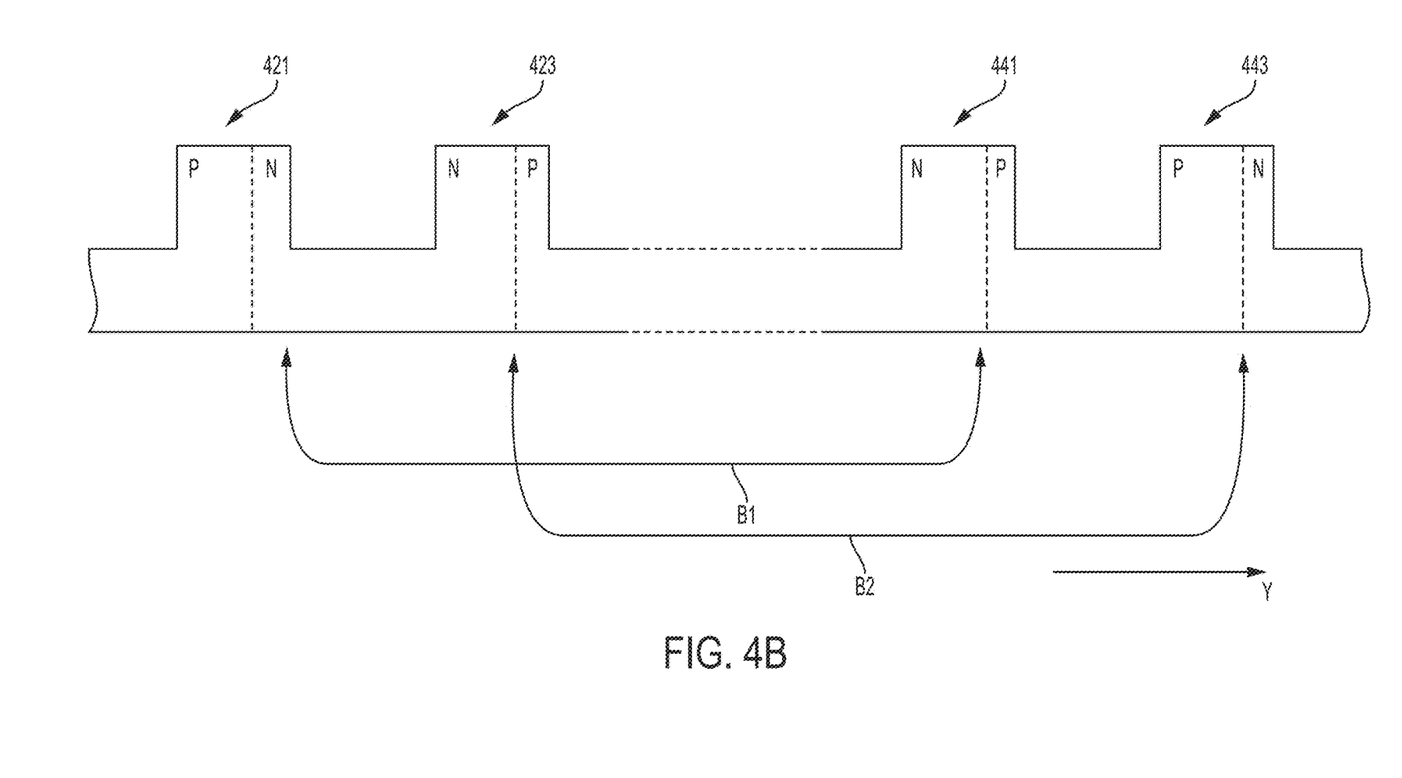
FIG. 4B is a cross sectional view of the optical Mach Zehnder modulator of FIG. 4A, according to some non-limiting embodiments.

FIG. 4B, which is a cross sectional view of optical Mach Zehnder modulator 400 taken along the CC' line, illustrates how imbalances in absorption loss caused by pn-junction misalignments may be compensated for. Here, it is assumed that all pn-junctions are laterally offset in a direction parallel to the y-axis. As a result, waveguide arms 421 and 443 have a majority of p-doping, while waveguide arms 423 and 441 have a majority of n-doping. However, since one optical mode first travels along waveguide arm 421 and then travels along waveguide arm 441 (as indicated by arrow B1) and another optical mode first travels along waveguide arm 423 and then travels along waveguide arm 443 (as indicated by arrow B2), the absorption loss experiences by the two optical modes may be balanced.

In some circumstances, different RF signals may be used for the different segments. In this way, RF attenuation losses may be limited. To ensure signal integrity, the RF signals may be delayed from one another by an amount of time substantially equal to (e.g., within 10% of the periodicity of the modulating carrier) the time it takes an optical signal to travel from one segment to the next. One example of such a configuration is illustrated in FIG. 4C.

Figure 4C:
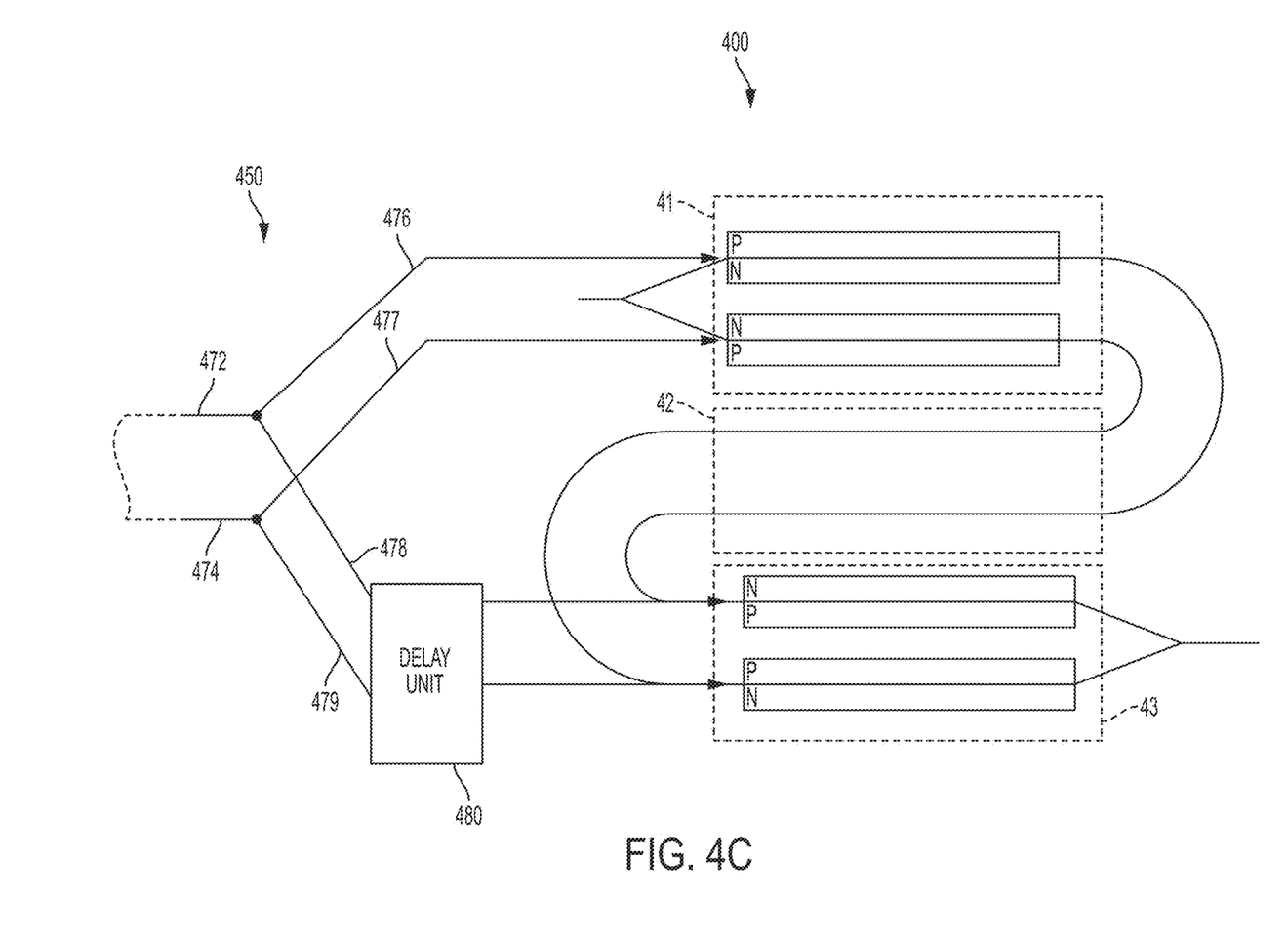
FIG. 4C illustrates schematically an optical Mach Zehnder modulator and part of a modulator driver, according to some non-limiting embodiments.

FIG. 4C illustrates optical Mach Zehnder modulator 400 and a portion of a modulator driver 450. The modulator driver may be configured to provide RF signals for modulating optical modes traveling in the optical Mach Zehnder modulator 400. Modulator driver 450 may comprise circuitry for generating RF signals (not shown in FIG. 4C). RF signals may be received via differential metal trace 472 and 474, and may be split into a pair of differential metal traces. Differential metal traces 476 and 477 may be used to provide the RF signal to the pn-junctions of segment 41. Differential metal traces 478 and 479 may be used to provide the RF signal to the pn-junctions of segment 43. In some embodiments, the RF signal provided to segment 43 may be delayed using delay unit 480. To ensure signal integrity, in some embodiments, the RF signal may be delayed by an amount of time substantially equal to the time it takes an optical signal to travel from segment 41 to segment 43 (e.g., from the beginning of segment 41 to the beginning of segment 43). Compared to a case in which an RF signal travels along the entire length of the modulator, in this embodiment, the distance traveled by the RF signals may be shorter, thus reducing attenuation loss.

RF signals of the type described herein may exhibit any suitable data rate, such as between 1 Gbit/s and 100 Gb/s, between 10 Gbit/s and 100 Gb/s, between 25 Gbit/s and 60 Gb/s, or between 25 Gbit/s and 40 Gb/s. It should be appreciated that the method described in connection with FIG. 4C may be applied to the embodiment of FIG. 2A.

The aspects of the present application may provide one or more benefits, some of which have been previously described. Now described are some non-limiting examples of such benefits. It should be appreciated that not all aspects and embodiments necessarily provide all of the benefits now described. Further, it should be appreciated that aspects of the present application may provide additional benefits to those now described.

Aspects of the present application reduce the sensitivity of an optical Mach Zehnder modulator to misalignments of the phase modulators (e.g., pn-junctions or pin-junctions) with respect to the waveguide arms. In some embodiments, by partitioning the modulator in segments, and by separating the segments using curved waveguides, imbalances in the absorption loss in one segment may be canceled (or limited) by imbalances in the absorption loss in another segment. In this way, the extinction ratio and modulation chirp of the optical modulated signal may be improved.

Aspects of the present application reduce the attenuation loss incurred by an RF signal configured to modulate an optical signal traveling in an optical Mach Zehnder modulator. In some embodiments, the different segments may be modulated by different RF signals, thereby reducing the distance traveled by each RF signal. This may cause a reduction in the attenuation loss, and as a result, an increase in the modulator's electrical bandwidth in some embodiments.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. A Mach Zehnder modulator comprising:
a first waveguide arm having a first pn-junction formed therein;
a second waveguide arm having a second pn-junction formed therein;
a third waveguide arm having a third pn-junction formed therein, the third waveguide arm being coupled to the first waveguide arm via a first curved waveguide;
a fourth waveguide arm having a fourth pn-junction formed therein, the fourth waveguide arm being coupled to the second waveguide arm via a second curved waveguide;
an input waveguide coupled to both the first waveguide arm and second waveguide arm;
an output waveguide coupled to both the third waveguide arm and fourth waveguide arm;
driver circuitry configured to drive the first and the second pn-junctions with a first RF signal and the third and fourth pn-junctions with a second RF signal; and
a delay unit configured to delay the second RF signal with respect to the first RF signal.

2. The Mach Zehnder modulator of claim 1, wherein the first and third waveguide arms are substantially parallel to each other and the second and fourth waveguide arms are substantially parallel to each other.

3. The Mach Zehnder modulator of claim 1, wherein the first and second curved waveguides are U-shaped.

4. The Mach Zehnder modulator of claim 1, wherein the first and second curved waveguides are at least partially undoped.

5. The Mach Zehnder modulator of claim 1, wherein the first and third waveguide arms are separated by an odd number of U-shaped curved waveguides, one of the odd number of curved waveguides being the first curved waveguide.

6. The Mach Zehnder modulator of claim 5, wherein the first and second pn-junctions form a first segment, the first segment having a first polarity, and wherein the third and fourth pn-junctions form a second segment, the second segment having the first polarity.

7. The Mach Zehnder modulator of claim 1, wherein the first curved waveguide has a fifth pn-junction formed therein and the second curved waveguide has a sixth pn-junction formed therein.

8. The Mach Zehnder modulator of claim 1, wherein the delay unit is configured to delay the second RF signal with respect to the first RF signal by an amount approximately equal to an optical delay between the first pn-junction and the third pn-junction.

9. The Mach Zehnder modulator of claim 1, wherein the first, second, third and fourth pn-junctions are lateral pn-junctions.

10. The Mach Zehnder modulator of claim 1, wherein the first, second, third and fourth waveguide arms are formed on a silicon substrate.

11. A method of operating a Mach Zehnder modulator, the method comprising:
   coupling an optical signal to first and second waveguide arms of the Mach Zehnder modulator;
   coupling the optical signal from the first waveguide arm to a third waveguide arm of the Mach Zehnder modulator and from the second waveguide arm to a fourth waveguide arm of the Mach Zehnder modulator, the third waveguide arm being coupled to the first waveguide arm via a first curved waveguide, and the fourth waveguide arm being coupled to the second waveguide arm via a second curved waveguide;
   modulating the optical signal by driving, with a first RF signal, a first pn-junction formed in the first waveguide arm and a second pn-junction formed in the second waveguide arm and with a second RF signal, a third pn-junction formed in the third waveguide arm and a fourth pn-junction formed in the fourth waveguide arm; and
   delaying the second RF signal with respect to the first RF signal.

12. The method of claim 11, wherein delaying the second RF signal with respect to the first RF signal comprises delaying the second RF signal with respect to the first RF signal by an amount approximately equal to an optical delay between the first pn-junction and the third pn-junction.

13. The method of claim 11, wherein modulating the optical signal by driving, with a first RF signal, a first pn-junction comprises modulating the optical signal at a frequency corresponding to an optical signal data rate between 1 Gbit/s and 100 Gbit/s.

14. The Mach Zehnder modulator of claim 1, wherein the first curved waveguide is arranged such that the first waveguide arm and the third waveguide arm are configured to support substantially opposite directions of propagation of light relative to each other and the second curved waveguide is arranged such that the second waveguide arm and the fourth waveguide arm are configured to support substantially opposite directions of propagation of light relative to each other.

15. The method of claim 11, where the first curved waveguide is arranged such that the first waveguide arm and the third waveguide arm are configured to support substantially opposite directions of propagation of light relative to each other and the second curved waveguide is arranged such that the second waveguide arm and the fourth waveguide arm are configured to support substantially opposite directions of propagation of light relative to each other.

* * * * *